P. H. TROUTMAN.
ORCHARD HEATING DEVICE.
APPLICATION FILED JAN. 2, 1909.

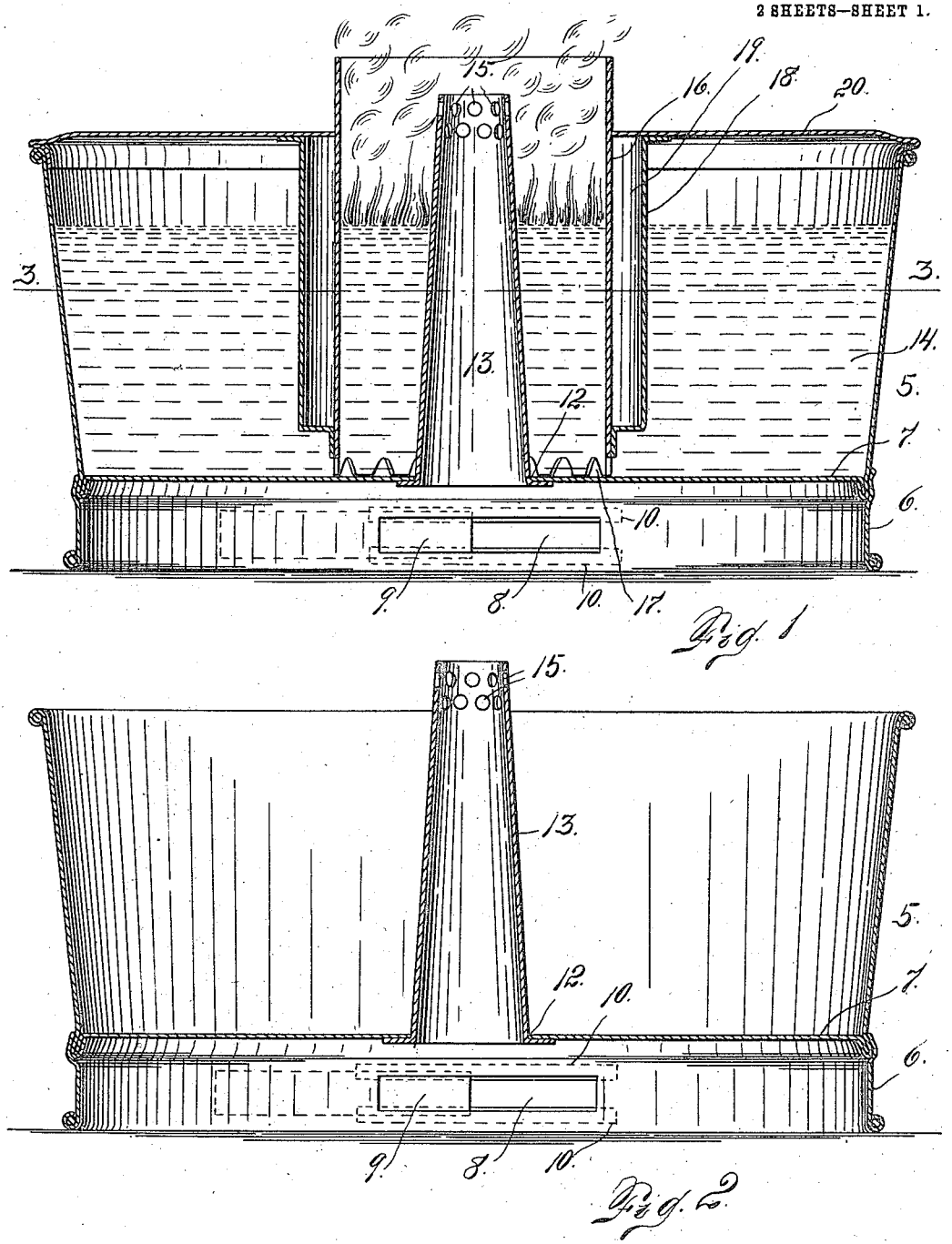

961,662.

Patented June 14, 1910.
2 SHEETS—SHEET 2.

Witnesses
Otto E. Hoddick
I. D. Thornburgh

Inventor
P. H. Troutman
By ... Attorney

UNITED STATES PATENT OFFICE.

PERCIVAL HAMMER TROUTMAN, OF CANON CITY, COLORADO.

ORCHARD-HEATING DEVICE.

961,662.

Specification of Letters Patent. Patented June 14, 1910.

Application filed January 2, 1909. Serial No. 470,522.

*To all whom it may concern:*

Be it known that I, PERCIVAL HAMMER TROUTMAN, a citizen of the United States, residing at Canon City, county of Fremont, and State of Colorado, have invented certain new and useful Improvements in Orchard-Heating Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in devices for heating orchards, or other localities, to prevent injury from frost.

My improved device consists of a reservoir adapted to hold liquid fuel and a centrally located casing forming a combustion chamber which is separated from the surrounding fuel in the reservoir, the lower extremity of the said casing being notched or recessed to allow the liquid fuel to enter the combustion chamber at the bottom. This casing is attached to the top of the reservoir and is removable therewith. The bottom of the reservoir is provided with a centrally located opening surrounded by a chimney, which projects upwardly therefrom. When the parts are assembled, this chimney is in the center of the combustion chamber or the casing which forms said chamber. By means of the chimney, provision is made for a center draft upwardly through the combustion chamber, thus facilitating the burning of the liquid fuel. The reservoir is preferably supported a suitable distance above the ground or other surface upon which it rests, by means of a base extending downwardly from the bottom of the reservoir and having a draft opening controlled by a slide whereby air is allowed to enter the base and pass upwardly through the chimney, which is open at both ends. To prevent the heat in the combustion chamber from unduly raising the temperature of the oil, or other liquid fuel in the reservoir, the outer portion of the casing is preferably provided with an auxiliary wall spaced from the main wall of the casing forming an air chamber, whereby the oil within the receiver is insulated from the combustion chamber.

Having briefly outlined my improved construction, I will proceed to describe the same in detail, reference being made to the accompanying drawing in which is illustrated an embodiment thereof.

Figure 3:
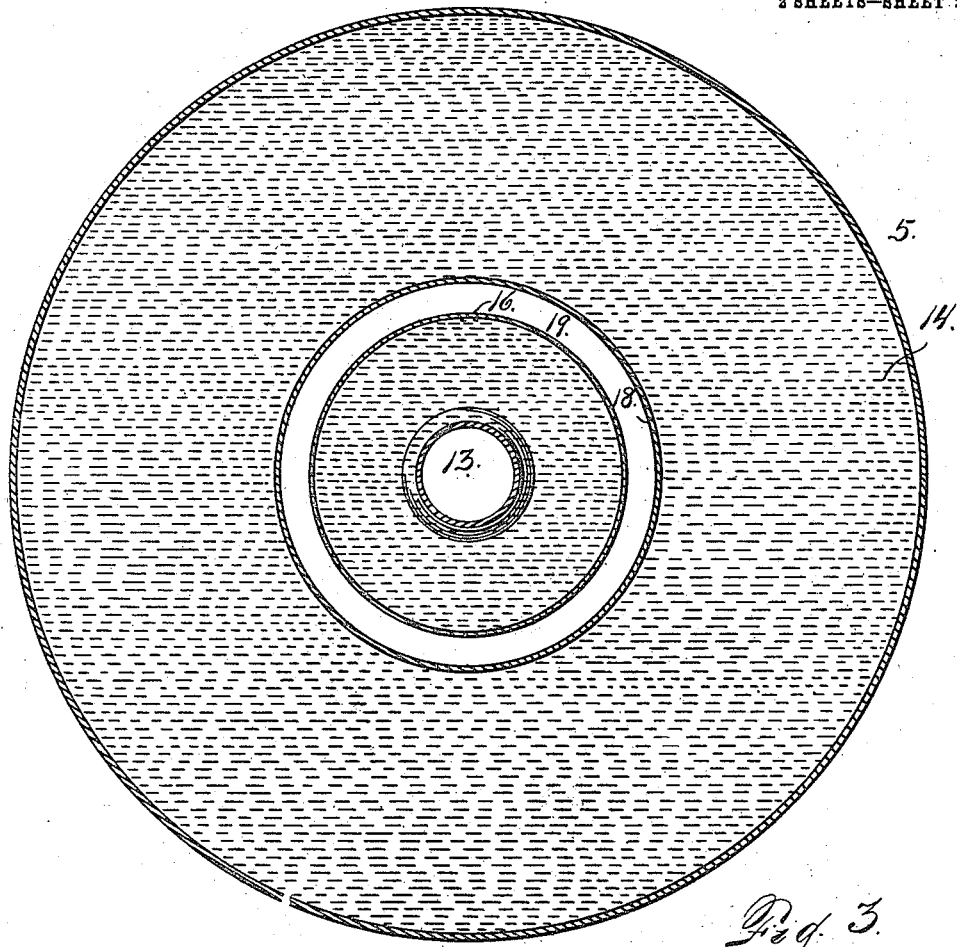
Figure 4:
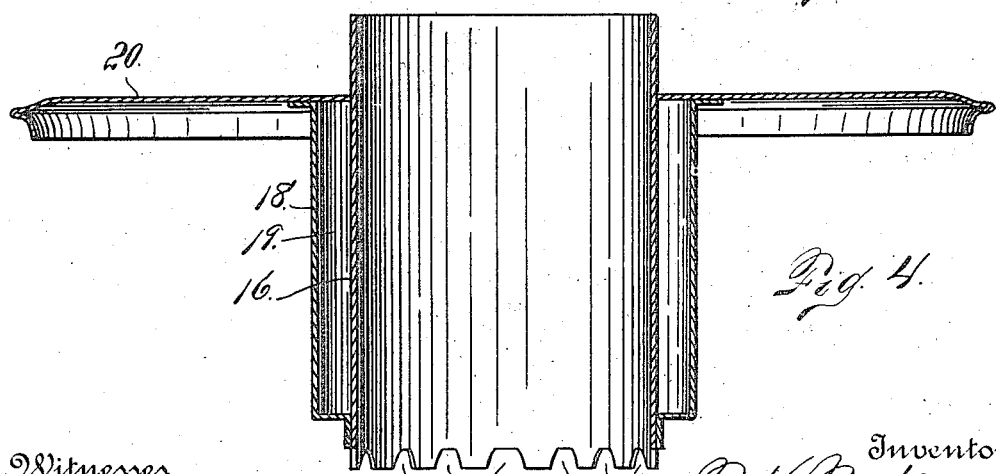

In this drawing, Figure 1 is a central vertical section taken through my improved orchard heating device, showing the same complete and in use. Fig. 2 is a similar section, taken through the reservoir, the casing forming the combustion chamber being removed. Fig. 3 is a horizontal section taken through the device on the line 3—3, Fig. 1. Fig. 4 is a sectional detail view of the combustion chamber and the reservoir top.

The same reference characters indicate the same parts in all the views.

Let the numeral 5 designate the reservoir considered in its entirety. This reservoir is provided with a base 6, which extends below its bottom 7. In this base is formed an air opening 8 controlled by a slide 9 moving in grooves 10 which are indicated by dotted lines. The bottom of the reservoir is provided with a central opening 12 from which extends upwardly a chimney 13, which is preferably frustum-shaped, being larger at the bottom than at the top. Both extremities of this chimney are open. Near the top and above the liquid fuel 14, the chimney may be perforated, as shown at 15. Centrally located in the reservoir, and surrounding the chimney 13, is a casing 16, whose lower edge is notched, as shown at 17, to allow the liquid fuel to enter the casing, which, as aforesaid, constitutes a combustion chamber. To this casing is secured a cover 20 for the reservoir 5. The casing is also provided exteriorly with an auxiliary wall 18, which is spaced from the casing, forming an air chamber 19 for insulating the oil in the reservoir from the combustion chamber.

When the device is in use the parts are assembled, as shown in Figs. 1 and 3. A suitable quantity of oil or other liquid fuel may be placed in the reservoir, after which the casing forming the combustion chamber, together with the cover, are put in position. Or, the parts may be first assembled, after which the liquid fuel may be poured into the combustion chamber, whence it readily passes into the surrounding portion of the reservoir through the openings 17 at the bottom of the casing. The fuel within the combustion chamber is then lighted in any suitable manner, and as it burns it is replenished from the surrounding body of oil within the reservoir. The latter may be of any suitable size.

The insulating wall 18, with which the casing 16 is provided, also serves to prevent the liquid fuel within the combustion chamber from becoming unduly cooled by the surrounding body of liquid fuel, in case the latter should be of a temperature sufficiently low to have a cooling effect. It will thus be understood that this partition performs the double function of insulating the oil in the combustion chamber from the cooling influence of the surrounding body of oil, and also of preventing the temperature surrounding the body of oil from becoming unduly raised by the heat of the combustion chamber.

Having thus described my invention, what I claim is:

1. An orchard heater comprising a fuel containing reservoir having an opening in the bottom thereof, a centrally located open-ended chimney communicating with the said opening, said chimney extending upwardly through said reservoir, a vertically disposed partition located in the reservoir and forming a combustion chamber around the chimney, the said partition having openings in the bottom through which fuel is fed to the combustion chamber, a second partition vertically disposed around said combustion chamber and forming an insulating chamber between the combustion chamber and the fuel in the reservoir, and a support for the reservoir, the said support constructed to allow air to enter the chimney, substantially as described.

2. An orchard heater comprising a fuel containing reservoir having an opening in the bottom thereof, a centrally located open-ended chimney communicating with the said opening and extending upwardly therefrom, a vertical partition surrounding the chimney and forming a combustion chamber, a second partition inclosing an insulating space between the combustion chamber and the fuel containing reservoir, a cover for the reservoir carried by the said partition, the said cover also forming a closure for the insulating space, and a support extending below the bottom of the reservoir, the said support being constructed to allow air to enter the chimney for draft purposes, substantially as described.

In testimony whereof I affix my signature in presence of two witnesses.

PERCIVAL HAMMER TROUTMAN.

Witnesses:
J. H. TROUTMAN,
A. EBERT O'BRIEN.